May 24, 1955 S. C. HETH 2,708,821
SELF-ALIGNING BEARING FOR CORN PICKER SNAPPING ROLL
Filed May 31, 1951
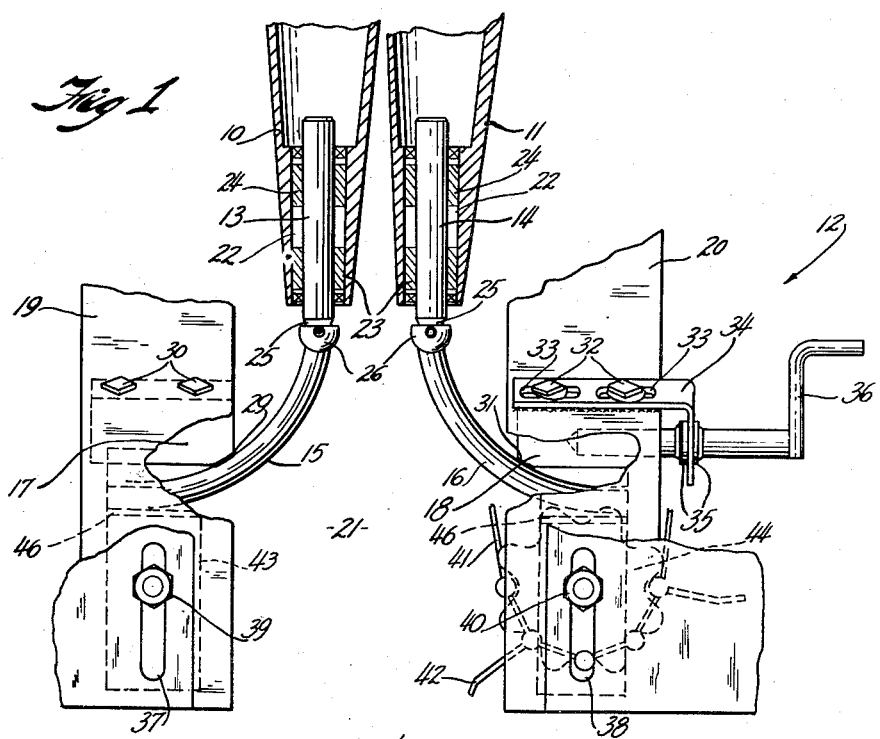
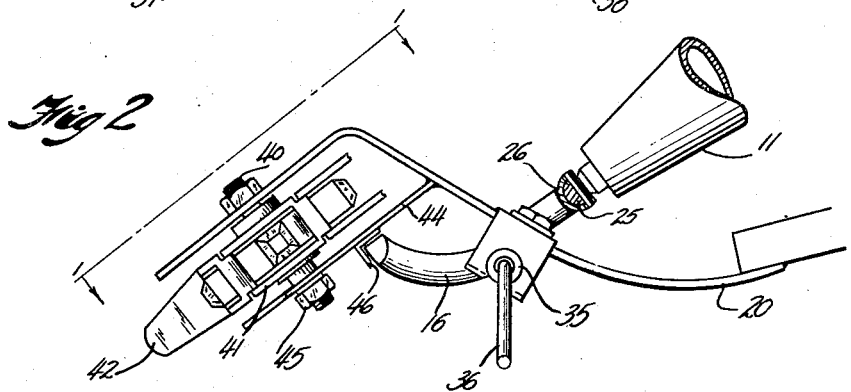
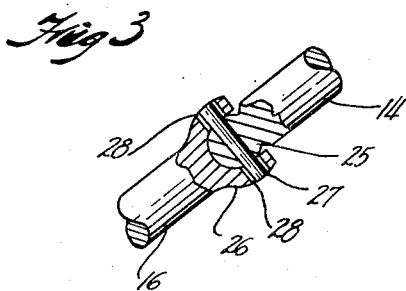
INVENTOR.
SHERMAN C HETH
BY
ATT'Y

United States Patent Office 2,708,821
Patented May 24, 1955

2,708,821

SELF-ALIGNING BEARING FOR CORN PICKER SNAPPING ROLL

Sherman C. Heth, Racine, Wis., assignor to J. I. Case Company, Racine, Wis., a corporation of Wisconsin Application May 31, 1951, Serial No. 229,229

9 Claims. (Cl. 56—119)

My invention relates to corn harvesters and more particularly to corn pickers having snapping rolls for breaking corn ears from the stalks wherein the lower end of the rolls are mounted in self-aligning bearings.

It is therefore an object of my invention to provide a self-aligning bearing for the lower end of the snapping rolls which will allow the stub shafts to align themselves with the ends of the snapping rolls to thereby avoid binding when the frame members, guiding rods, and the snapping rolls owing to unavoidable manufacturing imperfections, adjustments and the like are in misalignment.

A further object is the provision of self-adjustable supports for the snapping rolls of a corn picker, which, in association with the gathering chains, and other related parts of the machine, will insure proper operation under all normal conditions of use.

A still further object of this invention is to provide an inexpensive, durable, and highly efficient support for the lower end of a snapping roll.

Further objects and advantages of this invention will become apparent from a perusal of the following description and drawing.

In the drawings:

Fig. 1 is a fragmentary view with parts in section and others broken away taken normal to the plane 1—1 of Fig. 2, disclosing the forward end portion of a corn picker showing the lower ends of the rolls mounted in self-aligning bearing supports and their relationship with the other working mechanisms normally found forwardly in a corn picker.

Fig. 2 is a fragmentary side elevational view of the corn picker of Fig. 1 illustrating in section a self-aligning bearing illustrative of the present invention.

Fig. 3 is an enlarged fragmentary view with parts in section of the self-aligning bearing of Fig. 2.

Referring to the drawings the corn picker in the present instance is provided with a pair of forwardly and downwardly extending snapping rolls 10 and 11 including means 12 for adjusting one of the rolls relative to the other, thereby allowing for a variation in spacing between the rolls through which the stalks of corn pass when the machine is in operation. The forward ends of the snapping rolls 10 and 11 are journaled on stub shafts 13 and 14 which in turn are secured in the rearwardly extending ends of a pair of forwardly diverging, curved stalk-guiding rods 15 and 16 which are rigidly attached at their forward end portions to shoulder blocks 17 and 18 which in turn, are mounted on forwardly extending parallel frame members 19 and 20 of the corn picker. The stub shafts 13 and 14 are secured in the ends of the guiding rods 15 and 16 so as to allow the stub shafts to align themselves with the ends of the snapping rolls when the ends of the rolls, the frame members 19 and 20, and the guiding rods 15 and 16 are not in perfect alignment as will be fully described hereinafter.

More specifically the parallel frame members 19 and 20 are arranged to provide between the forward ends thereof a passageway 21 through which the stalks of corn pass when the machine is in operation. The rolls 10 and 11 are mounted so their forward ends terminate within the passageway 21, the stalks of corn being guided between the ends of the rolls by the guiding rods 15 and 16 and by the stub shafts 13 and 14. Means are provided, not shown, for rotating the rolls opposite to one another to provide the necessary snapping effect, said means being of any conventional or suitable type and not a part of the present invention.

The lower ends of the rolls 10 and 11 have formed therein axial bores 22, into which are pressed bearing sleeves 23 and 24 into which the stub shafts 13 and 14 are journaled. Forwardly the shafts 13 and 14 terminate into spherical bearing surfaces 25 which are fitted in sockets 26 formed at the rearward ends of the guiding rods 15 and 16. To maintain the stub shafts 13 and 14 in their proper position with respect to the rods 15 and 16 and to still allow the shafts 15 and 16 to displace themselves sufficiently within the sockets 26 to compensate for any misalignment between the rolls 10 and 11, the frame members 19 and 20, and the guiding rods 15 and 16, pins 27 are provided securing thereby the spherical bearing surfaces 25 of the shafts 13 and 14 within the sockets 26 of the rods 15 and 16. As best seen in Fig. 3 the pins 27 in the present instance, are fitted tightly in the spherical bearing surfaces 25 and protrude outwardly into holes 28 formed in the sockets 26. The holes 28, it will be seen, are slightly greater in diameter than the diameter of the pins 27 permitting thereby the movement of the spherical bearing surfaces 25 within the sockets 26 in substantially all directions the distance that the radius of the holes 28 is larger than the radius of the pins 27 while preventing complete rotation of the bearing surfaces within the sockets 26. Swinging movement of the stub shafts 13 and 14 in a plane substantially normal to the axis of the respective pins 27 is limited to substantially the same amount of movement permitted the stub shafts in the sockets in a plane oblique to the axis of the respective pins 27, the sockets 26 abutting against the shank of the respective stub shafts 13 and 14 so as to limit swinging movement thereof. This limited play of the spherical bearing surfaces within the sockets, permits the shafts 13 and 14 to absorb or relieve any binding which would otherwise occur in the event that the various elements of the forward portion of the corn picker become out of alignment with one another. It will be further noted that the sockets open rearwardly thereby presenting an unobstructed surface for the stalks of corn to pass over when guided between the snapping rolls 10 and 11 as the machine is drawn down a row of corn.

Shoulder block 17 to which the guide rod 15 is secured as by welding or the like at 29 is rigidly mounted on frame member 19 by means of clamping bolts 30 and is held in a fixed position with respect to the frame member 19, the bolts 30 being passed through the member 19 and threaded into the block 17. The block 18 to which the rod 16 is attached, as by welding or the like at 31, is adjustable in a lateral direction relative to the frame member 20 and thus allows for movement of roll 11 relative to the roll 10. The shoulder block 18 is secured in slidable relationship to the frame member 20 by means of guide bolts 32, said bolts passing through frame member 20 and being threaded into the block 18. Slots 33 are cut through an L-shaped bracket 34 which is rigidly attached, by welding or the like, to the frame member 20, said slots being also cut through the frame member 20, thereby providing a pair of elongated slots in fixed registering relationship. The bolts 32 pass through these slots and thus guide the block 18 in lateral movement with respect to the frame member 20, the bolts 32 being secured tightly in the block 18 but permitted to slide in the slot 33 by means of suitable spacer sleeves, as well known in the art and not shown in the drawings. In order to effect this relative movement, and a corresponding relative movement of the snapping roll 11 with respect to the roll 10, the adjustment means 12 is provided as previously suggested. The adjusting means 12 comprises a screw, threaded into the adjustable shoulder block 18 and rotatably mounted on the adjacent frame member 20 by means of the L-shaped bracket 34. The positioning screw is restrained from endwise movement by a pair of collars 35. A handle 36 is rigidly attached to the outer end of the adjusting means 12 to facilitate turning of said means.

Forwardly of the shoulder blocks 17 and 18 on the adjacent frame members 19 and 20 are slots 37 and 38 into which the usual gathering chain journals 39 and 40 pass, thus allowing the gathering chain sprocket journals to be moved in a forward direction for tightening the respective gathering chains 41, only one of which is shown on the drawing. The gathering chain 41 is provided with a plurality of fingers 42 which gather the stalks and convey them through the snapping rolls and further aid in moving the snapped ears rearwardly to a conveyor, not shown, for distribution. Anchoring plates 43 and 44 are provided with slots, not visible, for receiving the ends of the journals 39 and 40 and extend rearwardly to the frame members 19 and 20 being secured thereto as by welding or the like, the journals being secured in adjusted positions to the plates 43 and 44 by means of suitable nuts 45 as well known in the art. Transverse angle bars 46, in the present instance, are secured as by welding or the like to the underside of the anchoring plates 43 and 44. As can be seen in Fig. 1 the forward ends of the guide rods 15 and 16 are bent laterally and accommodated between the inner faces of the angle bars 46 and consequently protected from weeds or the like by the forward face of the angle bars 46. When the shoulder block 18 displaces the guide rod 16 laterally or inwardly in a manner already described the forward end portion of the guide rod is moved axially within the inner face of the angle bar 46 in the same direction as is clear from the drawing.

It will be seen from the foregoing description that a simple, durable, and inexpensive self-aligning mounting has been provided for the snapping rolls. By means of this self-aligning bearing connection between the stub shafts and the guide rods, any binding which would normally occur if either the frame members, the guide rods, or the snapping rolls were jarred out of their proper positions with respect to each other as frequently happens when the machine is operated over rough terrain, is compensated for by the limited play of the pins 27 in the holes 28 of the sockets 26. It should further be noted that the shock waves which would ordinarily be transmitted to the other parts of the corn picker but particularly to the shoulder blocks from the snapping rolls as the machine is drawn down a row of corn are greatly reduced and wear on the shoulder blocks consequently greatly decreased.

Various modifications and improvements within the spirit of my invention will doubtless occur to those skilled in the art from the disclosure herein given, and hence I do not wish to be limited to the particular construction shown or uses mentioned except to the extent that my invention is defined in the appended claims.

I claim:

1. In a corn picker having a snapping roll, and a forwardly extending frame member, a means for rotatably mounting said snapping roll with said frame member so that stalks of corn will be directed toward the roll upon forward movement of the corn picker, said means including a stub shaft axially journaled in said roll and extending forwardly therefrom, a guide shaft secured with said frame member and extending rearwardly toward said stub shaft, one of said shafts having formed thereon a spherical bearing surface, a socket formed on said other shaft adjacent said spherical bearing surface for reception thereof, and means for securing said spherical bearing surface in said socket for permitting limited movement of said spherical bearing surface in all directions in said socket so as to compensate for any misalignment between said frame member and said roll.

2. In a corn picker having a snapping roll, and a forwardly extending frame member, a means for rotatably mounting said snapping roll with said frame member so that stalks of corn will be directed toward the roll, said means including a stub shaft axially journaled in said roll and extending forwardly therefrom, said stub shaft having a spherical bearing surface formed adjacent the forward end thereof, a guide rod secured with said frame member and extending rearwardly toward said stub shaft, said guide rod having formed adjacent the rearward end thereof a socket for reception of said spherical bearing surface, and means for securing said spherical bearing surface in said socket but permitting limited movement of said spherical bearing surface in said socket in all directions sufficiently to compensate for any misalignment between said frame member and said roll.

3. In a corn picker having a snapping roll, and a forwardly extending frame member, a means for rotatably mounting said snapping roll with said frame member so that stalks of corn will be directed toward the roll, said means including a stub shaft axially journaled in said roll and extending forwardly therefrom, said stub shaft having a spherical bearing surface formed adjacent the forward end thereof, a guide rod secured with said frame member and extending rearwardly toward said stub shaft, said guide rod having formed adjacent the rearward end thereof a socket for reception of said spherical bearing surface, said socket having aligned holes formed therein, and a pin for securing said spherical bearing surface in said socket, said pin being fixed in said spherical bearing surface and protruding into said holes formed in said socket, the diameter of said holes being enough greater than the diameter of said pin to permit said stub shaft to swivel in all directions sufficiently to compensate for any misalignment between said frame member and said roll.

4. In a corn picker having a snapping roll, a forwardly extending frame member, and a shoulder block rigidly secured with said frame member, a means for rotatably mounting said snapping roll with said shoulder block so that stalks of corn will be directed toward the roll, said means including a stub shaft axially journaled in said roll and extending forwardly therefrom, said stub shaft having a spherical bearing surface formed adjacent the forward end thereof, a guide rod secured to said shoulder block and extending rearwardly toward said stub shaft, said guide rod having formed adjacent the rearward end thereof a socket for reception of said spherical bearing surface, said socket having aligned holes formed therein, and means protruding from said spherical bearing surface into said holes formed in said socket, the diameter of said holes being enough greater than the diameter of the last mentioned means to permit said stub shaft to move in all directions sufficiently to compensate for any misalignment between said frame member and said roll.

5. In a corn picker having a snapping roll, a forwardly extending frame member, and a shoulder block slidably secured with said frame member and responsive to turning of a crank, a means for rotatably mounting said snapping roll with said shoulder block so that stalks of corn will be directed toward the roll, said means including a stub shaft axially journaled in said roll and extending forwardly therefrom, said stub shaft having a spherical bearing surface formed adjacent the forward end thereof, a guide rod secured to said shoulder block and extending rearwardly toward said stub shaft, said guide rod having formed adjacent the rearward end thereof a socket for reception of said spherical bearing surface, said socket having aligned holes formed therein, and a pin for securing said spherical bearing surface in said socket, said pin being fixed in said spherical bearing surface and protruding into said holes formed in said socket, the diameter of said holes being enough greater than the diameter of said pin to permit said stub shaft to move in all directions sufficiently to compensate for any misalignment between said frame member and said roll.

6. In a snapping roll mounting for a corn picker having a frame and a plurality of snapping rolls, the combination of a stub shaft journaled in supporting relation to the front end of one of said rolls, a supporting bracket on the frame, a corn guiding member mounted on said bracket and adjustable relatively to said frame in a direction transverse to the axis of said snapping roll, said guiding member having a universal flexible connection to said stub shaft to compensate for changes in angular relation between said stub shaft and said corn guiding member.

7. In a snapping roll mounting for a corn picker having a frame and a plurality of snapping rolls, the combination of a stub shaft journaled in supporting relation to the front end of one of said rolls, a supporting bracket on the frame, a corn guiding member mounted on said bracket, said guiding member having a freely-angular adjustable connection to said stub shaft to compensate for changes in angular relation between said stub shaft and said corn guiding member during operation of the machine.

8. In a corn picker having a snapping roll, and a forwardly extending frame member, a means for rotatably mounting said snapping roll with said frame member so that stalks of corn will be directed toward the roll upon forward movement of the corn picker, said means including a stub shaft axially journaled in said roll and extending forwardly therefrom, and a guide shaft secured with said frame member and extending rearwardly toward said stub shaft, said stub shaft and said guide shaft being pivotally interconnected at adjacent ends to permit pivotal movement of said roll about said pivotal interconnection so as to compensate for any misalignment between said frame member and said roll member.

9. In a snapping roll mounting for a corn picker having a frame and a plurality of snapping rolls, the combination of a stub shaft journaled in supporting relation to the front end of one of said rolls, a supporting bracket on the frame, a corn guiding member mounted on said bracket and adjustable relatively to said frame in a direction transverse to the axis of said snapping roll, said guiding member having a flexible connection to said stub shaft to compensate for changes in angular relation between said stub shaft and said corn guiding member.

References Cited in the file of this patent
UNITED STATES PATENTS

| Number | Name | Date |
|---|---|---|
| 746,738 | Pelton | Dec. 15, 1903 |
| 1,280,207 | Glaze | Oct. 1, 1918 |
| 1,419,895 | O'Neill et al. | June 13, 1922 |
| 1,508,484 | Knapp | Sept. 16, 1924 |
| 1,694,438 | Chinn | Dec. 11, 1928 |
| 1,729,002 | Lontz | Sept. 24, 1929 |
| 2,434,124 | Schaaf et al. | Jan. 6, 1948 |
| 2,560,801 | Kuhlman | July 17, 1951 |
| 2,564,319 | Beck | Aug. 14, 1951 |